No. 608,116. Patented July 26, 1898.
E. X. GENOUD.
CASH REGISTER.
(Application filed July 17, 1897.)
(No Model.) 3 Sheets—Sheet 1.

Witnesses
C. Bradway
Victor J. Evans

Inventor
Eugene X. Genoud.
by John Wedderburn
Attorney

No. 608,116. Patented July 26, 1898.
E. X. GENOUD.
CASH REGISTER.
(Application filed July 17, 1897.)
(No Model.) 3 Sheets—Sheet 2.
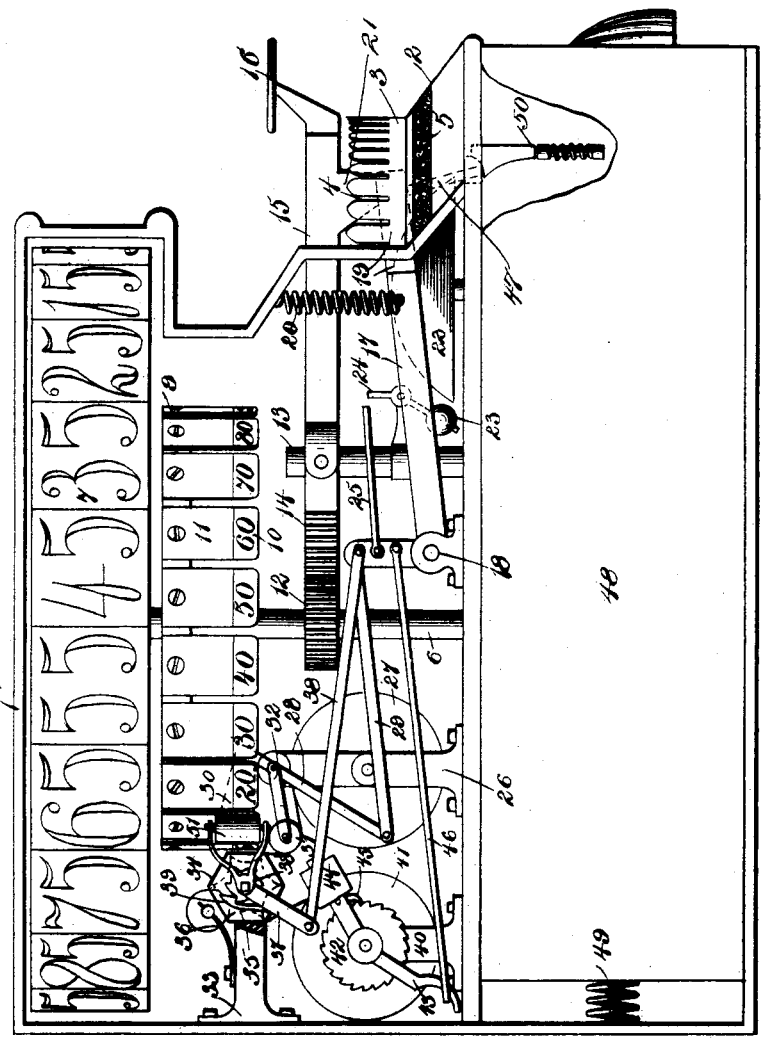
Witnesses
E. Bradway.
Victor J. Evans
Inventor
Eugene X. Genoud.
by John Wedderburn
Attorney

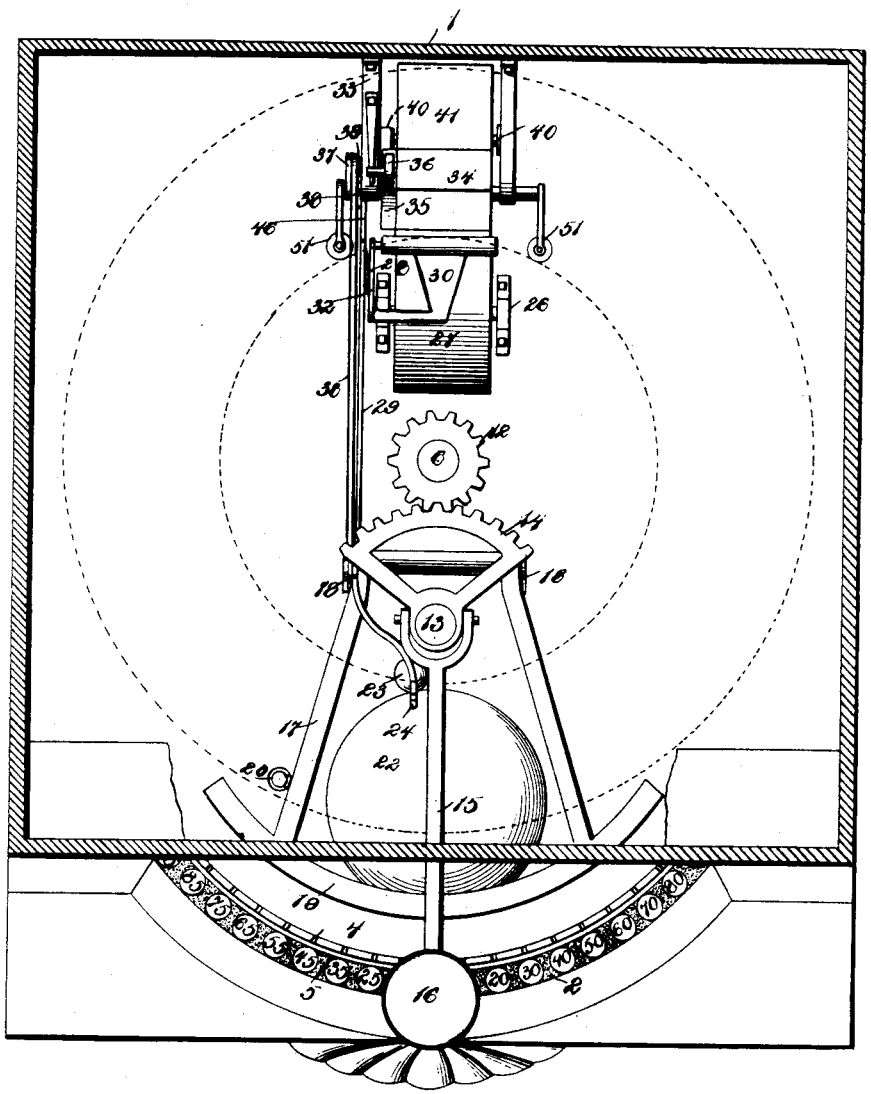

UNITED STATES PATENT OFFICE.

EUGENE X. GENOUD, OF JERSEY CITY, NEW JERSEY.

CASH-REGISTER.

SPECIFICATION forming part of Letters Patent No. 608,116, dated July 26, 1898.

Application filed July 17, 1897. Serial No. 644,926. (No model.)

*To all whom it may concern:*

Be it known that I, EUGENE X. GENOUD, of Jersey City, in the county of Hudson and State of New Jersey, have invented certain new and useful Improvements in Cash-Registers; and I do hereby declare the following to be a full, clear, and exact description of the invention, such as will enable others skilled in the art to which it appertains to make and use the same.

My invention relates to improvements in cash-registers; and its object is to provide an improved form of cash-register which may be readily constructed of few parts and those easily replaced in case of damage thereto.

My invention consists in certain novel features of construction and combination and arrangement of parts, as will be hereinafter described and claimed.

Figure 1:
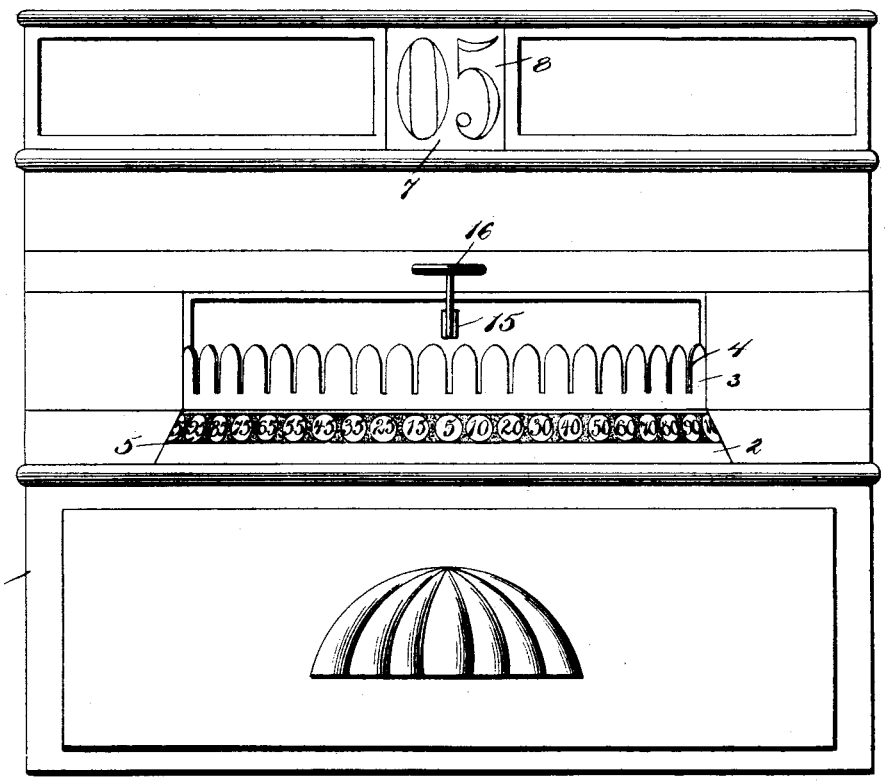
Figure 4:
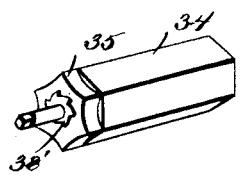

In the accompanying drawings, Figure 1 is a front view of my cash-register. Fig. 2 is an elevation thereof with the side cut away. Fig. 3 is a plan view thereof with the top and the indicating and numbering wheels removed, the periphery of the wheels being indicated by dotted lines. Fig. 4 is a detail of my revolving platen.

The numeral 1 indicates the casing of my device, which is provided with an ornamental indicating-band in the front thereof, as shown at 2. The band 2 has an upwardly-extending portion 3, which is provided with a series of notches 4 therein, into which the operating-lever is adapted to be pressed. A shaft 6 extends upward from the central portion of the casing of my cash-register. A circular indicating-wheel 7 is held on the upper end thereof and is provided on its perimeter with a series of numerals. A glazed sight-opening 8 is made in the front of my register. The numerals upon the wheel 7 are adapted to show through said glazed opening. A second wheel 9, which I denominate the "type-wheel," is supported upon said shaft below the indicator-wheel. This type-wheel has a series of type-plates mounted on the periphery thereof, which plates depend below the wheel. A pinion 12 is secured upon said shaft to rotate the same. A segmental gear 14, mounted in front of the shaft, meshes with the pinion 12 to impart rotation to the shaft and the wheels mounted thereon. A lever 15, having a key 16 thereon, extends outward from said casing, being pivoted to said segmental gear 14. A lever 17, fulcrumed as at 18, is provided with a segmental end 19. Springs 20, attached to said segmental ends, serve to normally hold said lever in a raised position. The lever 15 has a downwardly-projecting portion 21 resting upon said segmental end 19, and by this means when said key is depressed the lever 17 is also depressed. A bell 22 is held within said casing. A hammer 23, having an end 24 thereon, is fulcrumed within said casing to strike said bell. A bar 25 is attached to the short arm of said lever and is adapted upon the depression of the lever to strike the end 24 of the hammer 23 and ring said bell. A standard 26, supported in said casing, carries thereon a roll of paper 27. A lever 28 is fulcrumed at the upper end of this standard, and a pitman 29 connects said lever with the lever 17 at the end of the short arm thereof. A hammer 30 is held upon the lever 28 and is adapted by the motion of said lever to strike one of said spring-hung type-plates and force the same outward against the platen. A roller 31 is hung to the standard 26 from arms 32, and said roller is preferably made of some heavy material. The web of paper passes under this roll, thence up over the platen, and down to the drum 41, upon which it is wound. Bracket-arms 33 carry a platen 34. The platen 34 is preferably made with six sides, but more may be used if necessary or deemed advisable. A star-wheel 35 is held at one end of said platen and a spring-pressed roller 36 is held to roll thereon as said platen is turned and by its coöperation therewith to hold the platen stationary. A lever 37 is fulcrumed upon the axle of said platen and swings thereon. A rod 38 connects said lever with the lever 17. A pawl 39 is held upon the lever 37. A ratchet 38' is fixed to the platen 34 and is adapted through the movement of the lever 37 and the pawl 39, connected therewith, to rotate said platen. Standards 40 support a paper-windingd rum 41, having a ratchet 42 at the end thereof. A lever 43 is fulcrumed upon the shaft of the paper-winding roll and is provided with a weight 44 at the outer end thereof. A pawl 45 is held upon said lever. A rod 46 connects said lever to the shorter arm and the shaft of the lever 17. The lever 17 is provided with a downwardly-extending portion 47. The casing 1 is provided with a drawer 48, having a spring 49 in the back thereof, normally urging said drawer outward. A spring-pressed catch 50 is held to lock said drawer in its inward position immediately below the downwardly-extending portion 47 of the lever 17.

In operation the key 16 is grasped between the fingers and the lever 15 moved to the proper slot between the teeth 4, as indicated by the numeral 5. This lever is then depressed, carrying with it the longer arm of the lever 17. This in turn depresses the latch 50 and permits the drawer to slide out and at the same time rings the bell, as heretofore described. As the lever 43 is turned the indicating-wheel 7 and the printing-wheel 9 are also turned until the proper numeral is opposite the platen and opposite the display-opening 8. The depression of the lever 15 not only opens the drawer and rings the bell, but also actuates the lever 28, rotates the platen 34, and stamps the numeral upon the paper passing thereover. Upon the release of this lever the parts resume their normal position and the weight 44 causes the lever 43 to operate the ratchet-wheel 42, thus winding the paper on the wheel 41.

In connection with this device any suitable inking mechanism may be used; but I preferably employ an inking-roller 51, as shown in the drawings.

It is obvious that changes in the form, proportion, and minor details of construction may be resorted to without departing from the principle or sacrificing any of the advantages of this invention.

Having thus described my invention, what I claim as new, and desire to secure by Letters Patent, is—

1. In a cash-register, the combination of a vertically-disposed rotatable shaft having an indicator-wheel on the upper portion thereof and a type-wheel below the said indicator-wheel and rotatable equally with the latter, a platen in rear of the said type-wheel, paper-feeding devices carrying a paper strip movable over the said platen, a single key-lever shiftable in a horizontal plane in lateral directions and also depressible, and another lever below the said key-lever and operated by the latter, the said second lever having the rear thereof connected to the platen and paper-feeding devices.

2. In a cash-register, the combination of a vertically-disposed shaft having a horizontally-disposed indicator-wheel fixed to the upper portion thereof and rotatable therewith, a type-wheel on the said shaft below the indicator-wheel having a series of yielding type-plates arranged vertically, a platen in rear of the said type-wheel, paper-feeding devices for controlling the movement of a paper strip over the said platen, a hammer to engage the inner side of the said type-plates and press them toward the platen, operating-gears for the said shaft, a single key-lever shiftable in a horizontal plane in opposite lateral directions and also depressible, a second lever below the said key-lever, and connecting devices between the rear end of the said second lever and the paper-feeding devices, platen and hammer, whereby said latter parts are operated at proper times.

3. In a cash-register, the combination of a vertical shaft having a horizontally-disposed indicator-wheel fixed on the upper portion thereof and rotatable therewith, a type-wheel on the said shaft below the indicator-wheel having a series of depending yielding type-plates, a platen in rear of the said type-wheel having straight faces, paper-feeding devices to control the movement of a strip of paper over the said platen, a hammer to engage the inner side of the type-plates and press them toward the platen, an inking-roller at one side of the platen, gearing for operating the said shaft, a single key-lever shiftable in opposite lateral directions in a horizontal plane and also depressible, a front band having a series of notches therein alining with indications, the key-lever being movable into said notches, a second lever below the key-lever having a rear angular end, and connecting devices attached to the rear angular end of said second lever at varying elevations for operating the platen, hammer, paper-feeding devices and inking-roller simultaneously with the depression of the said key-lever.

4. In a cash-register, the combination with a central shaft having an indicator and type wheels carried thereon, a pinion fixed on said shaft, a segmental gear mounted in front of said shaft and meshing with said pinion, a single key-lever having its rear end attached to said segmental gear, said key-lever being shiftable in opposite lateral directions in a horizontal plane and also depressible, paper-feeding, inking and pressure devices, and a platen coacting with the said type-wheel, a second lever below the said key-lever having an outer extended segmental bearing-bar and a lower projection, connections between the rear end of the said second lever and the paper-feeding, inking, and pressure devices and platen, a cash-drawer having locking mechanism which is operated by the lower projection of the second lever, and a front band with notches therein alining with lower indications.

5. In a cash-register, the combination with a vertical shaft having an indicator-wheel horizontally disposed on the upper portion thereof, of a type-wheel on said shaft immediately below the indicator-wheel and in a like plane, said type-wheel having a series of pendent spring type-plates, means for pressing the type-plates outwardly for giving the impression therefrom, a single key-lever for operating the said devices movable in a horizontal plane for actuating the indicator and type wheels and also made depressible, and a second lever provided with a segmental arm underlying said key-lever to be operated by the depression thereof, and paper-feeding and printing devices operatively connected with said second lever, for the purpose and substantially as described.

6. In a cash-register, the combination with a vertical shaft, of an indicator-wheel secured on the upper portion thereof and disposed in a horizontal plane, a type-wheel also mounted on the said shaft below the indicator-wheel and arranged in a like plane with the latter, the said type-wheel having a series of depending yielding type-plates, a revoluble polygonal platen in rear of the type-wheel over which a paper strip has movement, a pressure device to engage the inner sides of said type-plates for moving them toward the platen, a single key-lever movable in a horizontal plane for rotating the indicator and type wheels and also made movable in a vertical plane, a second lever underlying said key-lever to be operated by the depression thereof, and connections between said second lever, revoluble platen and type-pressure device for operating them, substantially as described.

7. In a cash-register, the combination of a vertical shaft, a horizontally-disposed indicator-wheel fixed on the upper portion of said shaft, a similarly-disposed type-wheel on the said shaft below the indicator-wheel having depending yielding type-plates, a pinion on the shaft, a segmental gear engaging said pinion and mounted in advance of the shaft, a single key-lever attached to said pinion and shiftable in a horizontal plane in lateral directions and also depressible, a second lever below the said key-lever having a rear angularly-disposed end, a platen in rear of the said type-wheel, paper-feeding devices controlling the movement of a strip of paper over the said platen, an inking-roller, a hammer to engage the inner portions of the depending type-plates and move them toward the platen, a series of connecting devices extending from the rear angularly-disposed end of the second lever to the platen, inking-roller, hammer, and paper-feeding devices, a cash-drawer having a catch released by the pressure of the second lever, a gong and movable hammer therefor, an arm projecting forwardly from the rear angularly-disposed end of the second lever to operate the hammer of the gong, and a vertically-disposed band at the front of the machine having a series of notches therein alining with indications and into which the said key-lever is depressed.

8. In a cash-register, the combination with a casing, of a central vertical shaft carried therein, an indicator-wheel having a series of numerals impressed upon the periphery thereof carried upon said vertical shaft, a printing-wheel carried upon said vertical shaft, a series of springs depending from said printing-wheel, a series of type carried upon the lower ends of said springs, an inking-roller held to ink said type adjacent to said wheel, a gear carried upon said shaft, a counter-shaft, a segmental gear supported thereon meshing with the first-mentioned gear, a key-lever attached to said segmental gear in such manner that it is adapted to have a vertical movement with reference to the plane of said segmental gear and is adapted to rotate said segmental gear on said counter-shaft, a key held upon said key-lever, a toothed bar provided with a series of slots corresponding in number to the number of different type upon said type-wheel, a series of indicators corresponding to the type upon said type-wheel held upon said bar, a lever fulcrumed in said casing provided with a segmental end, a downwardly-projecting portion upon the first-mentioned lever adapted to rest on said segmental end, springs normally holding said second lever in a raised position, a cash-drawer, a spring normally urging said cash-drawer outward, a latch adapted to lock said cash-drawer when in its inward position, a projection upon the second lever adapted to relieve said latch and permit the cash-drawer to open, a bell, a hammer held to strike said bell, a rod held upon said second lever adapted to actuate said hammer, standards, a paper-roll supported thereon, a third lever supported upon said standards, a hammer adapted to press said type outward carried upon said third lever, a rod connecting said second and third levers, a polygonal platen held adjacent to said type, a lever carried upon the shaft of said platen, a ratchet formed upon said platen, a pawl held upon said lever to coact with said ratchet, a second bar extending from said platen-lever to said second lever, a star-wheel formed upon the end of said platen, a spring-pressed pawl adapted to engage the depressions of said star-wheel, a second pair of standards, a paper-roll held thereon adapted to receive the paper after it has passed said platen, a ratchet-wheel held upon said second paper-roll, a lever held thereon, a pawl carried upon said lever, a weight held upon said lever, a rod connecting said lever with the second lever before mentioned, and a roller hung from the first-mentioned standards under which said paper is adapted to pass in its course from said first-mentioned paper-roll to said platen, substantially as and for the purpose described.

In testimony whereof I have signed this specification in the presence of two subscribing witnesses.

EUGENE X. GENOUD.

Witnesses:
I. WEIL,
BERTHOLD LEVI.